United States Patent
Oh

(10) Patent No.: US 8,270,999 B2
(45) Date of Patent: *Sep. 18, 2012

(54) ELECTRONIC DEVICE EQUIPPED WITH FUNCTION OF INDICATING DIRECTION OF DESTINATION AND METHOD OF INDICATING DIRECTION OF DESTINATION

(75) Inventor: Jong Hwan Oh, Seoul (KR)

(73) Assignee: Pantech Co., Ltd., Seoul (KR)

( * ) Notice: Subject to any disclaimer, the term of this patent is extended or adjusted under 35 U.S.C. 154(b) by 8 days.

This patent is subject to a terminal disclaimer.

(21) Appl. No.: 12/645,912

(22) Filed: Dec. 23, 2009

(65) Prior Publication Data

US 2010/0099438 A1 Apr. 22, 2010

Related U.S. Application Data

(63) Continuation of application No. 11/647,636, filed on Dec. 28, 2006, now Pat. No. 7,660,592.

(30) Foreign Application Priority Data

Dec. 29, 2005 (KR) .................. 10-2005-0133300

(51) Int. Cl.
*H04W 24/00* (2009.01)
(52) U.S. Cl. .................. 455/457; 455/456.1; 455/456.2; 455/456.3; 455/456.6
(58) Field of Classification Search ............... 455/550.1, 455/552.1, 456.1–457, 566; 342/357.2, 357.25–357.29, 357.34–357.36; 701/201–216
See application file for complete search history.

(56) References Cited

U.S. PATENT DOCUMENTS

| | | | |
|---|---|---|---|
| 7,660,592 B2 * | 2/2010 | Oh | 455/457 |
| 7,706,934 B2 * | 4/2010 | Sakamoto et al. | 701/19 |
| 2002/0061755 A1 * | 5/2002 | Nohara et al. | 455/457 |
| 2003/0129995 A1 * | 7/2003 | Niwa et al. | 455/456 |
| 2003/0134665 A1 * | 7/2003 | Kato et al. | 455/566 |
| 2007/0010259 A1 | 1/2007 | Hoffman | |
| 2008/0068261 A1 | 3/2008 | Hempel | |
| 2008/0082262 A1 | 4/2008 | Silva et al. | |

OTHER PUBLICATIONS

Sakamoto, translation of JP2005-321841MT, Nov. 17, 2005.*
Notice of Allowance issued on Sep. 21, 2009 in U.S. Appl. No. 11/647,636.

* cited by examiner

*Primary Examiner* — Kathy Wang-Hurst
(74) *Attorney, Agent, or Firm* — H. C. Park & Associates, PLC

(57) ABSTRACT

A method for indicating a direction of a destination in a mobile communication terminal includes: receiving network identification information from a mobile communication network that is currently accessed; reading current location and declination information corresponding to the network identification information from a mobile communication network information table; obtaining true north information by using the declination information to correct magnetic north information of a current location measured with a geomagnetic sensor; obtaining direction information of the destination from the current location information on the basis of the true north information; and displaying the direction information of the destination.

9 Claims, 1 Drawing Sheet

| MCC | MNC | NETWORK NAME | LATITUDE | LONGITUDE | DECLINATION |
|---|---|---|---|---|---|
| 0x0202 | 0x0005 | vodafone | N35.25.23 | W135.25.23 | -25 |
| 0x0204 | 0x0016 | T-Mobile NL | N65.25.37 | E123.23.23 | -13 |
| 0x0208 | 0x0010 | SFR Francia | N42.38.23 | E65.25.28 | -10 |
|  |  |  |  |  |  |
|  |  |  |  |  |  |

10

ELECTRONIC DEVICE EQUIPPED WITH FUNCTION OF INDICATING DIRECTION OF DESTINATION AND METHOD OF INDICATING DIRECTION OF DESTINATION

CROSS REFERENCE TO RELATED APPLICATIONS

This application is a continuation of U.S. patent application Ser. No. 11/647,636, filed on Dec. 28, 2006 and now issued as U.S. Pat. No. 7,660,592, which claims the benefit of and priority to Korean Patent Application No. 10-2005-133300, filed on Dec. 29, 2005, both of which are hereby incorporated by reference for all purposes as if fully set forth herein.

BACKGROUND

1. Field of Disclosure

The present invention relates to a mobile communication terminal and, more particularly, to a mobile communication terminal which has a function of indicating a direction of a destination, and a method of indicating a direction of a destination in the mobile communication terminal.

2. Discussion of the Background

In general, information concerning the direction of magnetic north and the latitude and longitude of a current location is required to indicate the direction of the current location. A conventional mobile communication terminal uses a geomagnetic sensor to obtain the information concerning the direction of magnetic north, and receives from a user the information concerning the latitude and longitude of a current location. However, it is troublesome for the user to directly input the information concerning the latitude and longitude of a current location.

On the other hand, a satellite global positioning system (GPS) may be used to track the current location. However, in that case, a mobile communication terminal should be equipped with GPS.

SUMMARY

Exemplary embodiments of the present invention provide a mobile communication terminal that has a function of indicating a direction of a destination without a global positioning system (GPS) and a method of indicating the direction of a destination.

Additional features of the invention will be set forth in the description which follows, and in part will be apparent from the description, or may be learned by practice of the invention.

An exemplary embodiment of the present invention discloses a method for indicating a direction of a destination in a mobile communication terminal, including: receiving network identification information from a mobile communication network that is currently accessed; reading current location and declination information corresponding to the network identification information from a mobile communication network information table; obtaining true north information by using the declination information to correct magnetic north information of a current location measured with a geomagnetic sensor; obtaining direction information of the destination from the current location information on the basis of the true north information; and displaying the direction information of the destination.

The network identification information may be Public Land Mobile Network (PLMN) information received from the mobile communication network that is currently accessed, and may include a mobile country code (MCC) and a mobile network code (MNC) to identify the mobile communication network.

The mobile communication network information table may include the PLMN information and information concerning latitude, longitude and declination of the mobile communication network that is currently accessed.

The mobile communication network information table may be stored in a local storage unit of the mobile communication terminal.

The operation of obtaining direction information of the destination may further include receiving location information of the destination from a user.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figures 1, 2:
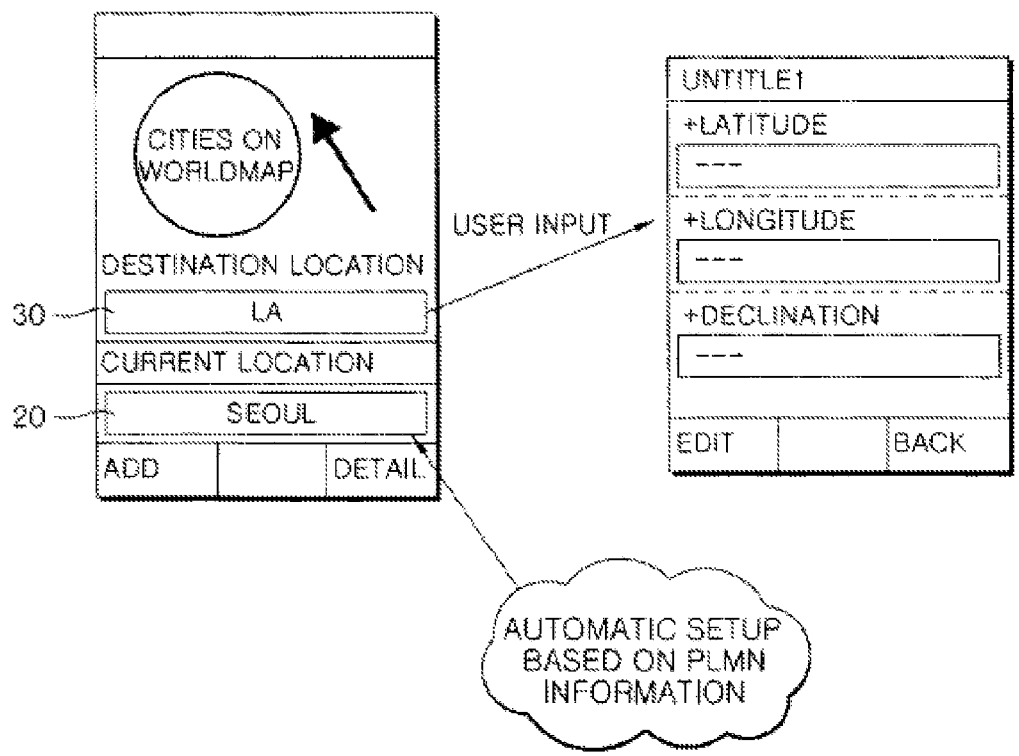
FIG. 1 shows a mobile communication network information table to indicate a direction of a destination according to an exemplary embodiment of the present invention.
FIG. 2 shows a user interface for indicating a direction of a destination according to an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

In general, information concerning the magnetic north, latitude and longitude, and declination of a current location is required to obtain information concerning a direction from the current location to a destination.

The magnetic north is the northern direction indicated by a compass needle. The magnetic north is inclined by 6 to 7° westward from the true north in Korea. The true north is the northern direction of the meridian at the point of observation. A longitude line on a map passing through the point of observation indicates the true north. In general, the true north can be obtained through information concerning the declination of a magnetic needle. The angle that the magnetic needle points away from the true north direction is called declination.

According to an exemplary embodiment of the present invention, the information concerning the latitude and longitude and the declination of a current location is obtained from Public Land Mobile Network (PLMN) information received from a mobile communication network.

Global System for Mobile Communications (GSM) is the most popular standard for mobile communication terminals in the world. In order to support GSM, a mobile communication terminal stores a mobile communication network information table based on information concerning worldwide network providers for GSM. The mobile communication network information table is also called a PLMN information table. The PLMN information table includes a Mobile Country Code (MCC) and a Mobile Network Code (MNC) as identification information to identify individual networks, and a network name that is specified by the identification information.

A mobile communication terminal accesses a mobile communication network operated by a network provider, receives an MCC and MNC from the mobile communication network, and retrieves a PLMN information table based on the MCC and MNC to obtain a name of the network provider.

According to an exemplary embodiment of the present invention, there is provided an extended PLMN information table containing information concerning the latitude and longitude of a current location and the declination of the current location as well as the network provider name.

FIG. 1 shows a mobile communication network information table to indicate a direction of a destination according to an exemplary embodiment of the present invention.

An extended PLMN information table includes information concerning a network name specified by network identification information such as a country code and a network code, the latitude and longitude used to detect a current location of each of mobile communication networks, and the declination used to correct magnetic north into true north. The PLMN information table is stored in a local storage area of a mobile communication terminal. When the mobile communication terminal accesses a mobile communication network, it receives a mobile country code (MCC) and a mobile network code (MNC) as PLMN information of the network. Accordingly, the mobile communication terminal can obtain the latitude, longitude and declination of a current location of the mobile communication network from the PLMN information table stored in the local storage area.

With the PLMN information, a method of obtaining information concerning a direction of a destination in a mobile communication terminal according to an exemplary embodiment of the present invention will be described.

In order to represent information concerning a direction of a destination inputted by a user, a mobile country code and a mobile network code are received as network identification information from a mobile communication network that is currently accessed by a mobile communication terminal, and information concerning the latitude, longitude and declination of a current location of the mobile communication network is read. The latitude, longitude and declination of a current location of the mobile communication network corresponds to the mobile country code and mobile network code received from an extended PLMN information table which is a mobile communication network information table stored in a local storage area. A true north direction is obtained by using the declination information to correct magnetic north of the current location of the mobile communication network measured with a geomagnetic sensor. When information concerning a direction of a destination, i.e., information concerning the latitude, longitude and declination of the destination, is input by a user, the information concerning the direction of the destination is obtained using the information concerning the true north and current location, and is displayed on a screen.

The above-mentioned method of obtaining the information concerning a direction of a destination using the true north, latitude and longitude of a current location, and latitude and longitude of the destination may use well-known algorithms, such as INVERSE, FORWARD, INVERS3D, and FORWRD3D.

FIG. 2 shows a user interface for indicating a direction of a destination according to an exemplary embodiment of the present invention.

The user interface includes current location information 20, which is automatically set with the extended PLMN information table, and destination location information 30, which is input by a user. Although the user directly inputs location information concerning a destination location in the present embodiment, a predetermined destination location information table or database may be used so that the user can input a desired destination on a map by pointing or scrolling. When the user inputs location information of a destination, direction information of the destination is calculated using the extended PLMN information table, and is displayed with an arrow on a screen as shown in FIG. 2.

The above-mentioned method according to the present embodiment of the invention may be stored in any form of recording media, such as CD-ROM, RAM, ROM, floppy disk, hard disk, or magneto-optical disk, or in any computer-readable form, such as computer code organized into executable programs. A description of a method of storing an exemplary embodiment of the present invention is well known in the art and will be omitted.

As apparent from the above description, a mobile communication terminal is provided which has a function of indicating a direction of a destination without GPS.

That is, since current location information and declination information can be easily obtained using the extended PLMN information table, it is possible to display information concerning a direction of a destination without GPS. Further, it is possible to display more accurate direction information by correcting the magnetic north into the true north using the declination information.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. A method for indicating a direction of a destination in an electronic device, comprising:
    obtaining current location information and declination information from a mobile communication network;
    measuring magnetic north information of a current location with a geomagnetic sensor;
    obtaining direction information of the destination from the current location information on the basis of the magnetic north information; and
    displaying the direction information of the destination.

2. A method for indicating a direction of a destination in an electronic device, comprising:
    obtaining current location and declination information from a communication network;
    measuring magnetic north information of a current location with a geomagnetic sensor;
    obtaining true north information by using the declination information to correct the magnetic north information of the current location;
    obtaining direction information of the destination from the current location information on the basis of the true north information; and
    displaying the direction information of the destination.

3. A method for indicating a direction of a destination in an electronic device, comprising:
- obtaining current location information from a mobile communication network, wherein current location information further comprises latitude, longitude, and the declination information from a Public Land Mobile Network (PLMN);
- measuring magnetic north information of a current location with a geomagnetic sensor;
- obtaining direction information of the destination from the current location information on the basis of the magnetic north information; and
- displaying the direction information of the destination.

4. The method of claim 1, wherein the current location information is obtained from a mobile communication network.

5. The method of claim 2, wherein the current location and declination information are obtained from a mobile communication network.

6. The method of claim 3, wherein the current location information is obtained from a mobile communication network.

7. A computer comprising a processor and a non-transitory computer-readable medium encoded with a computer program for implementing the method recited in claim 1 when executed.

8. A computer comprising a processor and a non-transitory computer-readable medium encoded with a computer program for implementing the method recited in claim 2 when executed.

9. A computer comprising a processor and a non-transitory computer-readable medium encoded with a computer program for implementing the method recited in claim 3 when executed.

* * * * *